(12) United States Patent
Barker et al.

(10) Patent No.: US 7,396,384 B2
(45) Date of Patent: Jul. 8, 2008

(54) FUEL CELL GAS SEPARATOR

(75) Inventors: Jarrod David Barker, Burnley (AU);
Jeremy Carl Lawrence,
Neubrandenburg (DE)

(73) Assignee: Ceramic Fuel Cells Limited, Victoria (AU)

( * ) Notice: Subject to any disclaimer, the term of this patent is extended or adjusted under 35 U.S.C. 154(b) by 503 days.

(21) Appl. No.: 10/501,153

(22) PCT Filed: Feb. 26, 2003

(86) PCT No.: PCT/AU03/00235

§ 371 (c)(1),
(2), (4) Date: Feb. 25, 2005

(87) PCT Pub. No.: WO03/073533

PCT Pub. Date: Sep. 4, 2003

(65) Prior Publication Data

US 2005/0155490 A1 Jul. 21, 2005

(30) Foreign Application Priority Data

Feb. 26, 2002 (AU) .................................. PS0765
Jul. 13, 2002 (WO) .................. PCT/AU02/00939

(51) Int. Cl.
*B01D 53/22* (2006.01)
*B01D 71/02* (2006.01)

(52) U.S. Cl. .................. 95/55; 95/45; 95/54; 95/56; 96/7; 96/11; 55/524; 55/DIG. 5; 429/32; 429/33

(58) Field of Classification Search .............. 96/7, 96/11; 95/45, 54, 55, 56; 55/523, 524, DIG. 5; 429/30, 32, 33, 17
See application file for complete search history.

(56) References Cited

U.S. PATENT DOCUMENTS 4,221,604 A   9/1980   Chirino et al.

(Continued)

FOREIGN PATENT DOCUMENTS

DE   4324181 A1   3/1994

(Continued)

OTHER PUBLICATIONS

K. Kendall et al. "Co-Formed Components for solid Oxide Fuel Cells", Solid Oxide Fuel Cells IV, 1995, pp. 229-233.

*Primary Examiner*—Jason M. Greene
(74) *Attorney, Agent, or Firm*—Birch, Stewart, Kolasch & Birch, LLP

(57) ABSTRACT

A fuel cell gas separator (14) between two planar solid oxide fuel cells (12) comprises a first layer (22) which is formed of a material that is impermeable to gases, a second layer (24) which is formed of a material that is impermeable to gases. The first and second layers have perforations (28) through their thickness which are closed by electrically conductive plug material (30). A third intermediate layer (26) between the first and second layers is electrically conductive and is in electrical contact with the plug material in the perforations through the first and second layers. The perforations in the first layer may be offset relative to the perforations in the second layer. The electrically conductive plug material in the perforations of the first and second layers may be the same, and may also be the same as the material of the third intermediate layer. The electrically conductive material may be silver or a silver-based material such as a silver-glass composite. Electrically conductive coatings may be provided over the electrode-contacting zones of the first and second layers.

51 Claims, 6 Drawing Sheets

U.S. PATENT DOCUMENTS

| | | |
|---|---|---|
| 4,640,876 A | 2/1987 | Warzawski et al. |
| 4,849,308 A | 7/1989 | Schmitten et al. |
| 4,963,442 A | 10/1990 | Marianowski et al. |
| 5,279,906 A | 1/1994 | Yoshimura et al. |
| 5,342,705 A | 8/1994 | Minh et al. |
| 5,496,655 A | 3/1996 | Lessing |
| 5,503,945 A | 4/1996 | Petri et al. |
| 5,681,373 A * | 10/1997 | Taylor et al. .................... 96/11 |
| 5,688,610 A | 11/1997 | Spaeh et al. |
| 5,827,620 A | 10/1998 | Kendall |
| 5,945,232 A | 8/1999 | Ernst et al. |
| 5,976,726 A * | 11/1999 | Wilkinson et al. ............ 429/32 |
| 6,040,076 A | 3/2000 | Reeder |
| 6,051,330 A | 4/2000 | Fasano et al. |
| 6,054,231 A | 4/2000 | Virkar et al. |
| 6,103,415 A | 8/2000 | Kurita et al. |
| 6,248,465 B1 | 6/2001 | Zhou et al. |
| 6,291,092 B1 | 9/2001 | Kohli et al. |
| 6,302,402 B1 | 10/2001 | Rynders et al. |
| 2002/0048701 A1 | 4/2002 | Ukai et al. |
| 2002/0068677 A1 | 6/2002 | Crosbie |
| 2003/0175569 A1* | 9/2003 | Inagaki et al. ................. 429/30 |
| 2005/0233195 A1* | 10/2005 | Arnold et al. ................. 429/30 |
| 2005/0260473 A1* | 11/2005 | Wang .......................... 429/33 |
| 2006/0040170 A1* | 2/2006 | Liu et al. ...................... 429/32 |

FOREIGN PATENT DOCUMENTS

| | | | |
|---|---|---|---|
| DE | 4324907 | A1 | 1/1995 |
| DE | 19832838 | A1 | 2/1999 |
| EP | 0450336 | A2 | 10/1991 |
| EP | 459940 | B1 | 3/1995 |
| EP | 0675557 | A1 | 3/1995 |
| EP | 0834950 | A2 | 9/1997 |
| EP | 0907215 | A1 | 10/1997 |
| EP | 959511 | A2 | 11/1999 |
| EP | 0 993 059 | A2 | 4/2000 |
| EP | 0993059 | A2 | 4/2000 |
| EP | 1035610 | A2 | 9/2000 |
| GB | 1515688 | | 6/1978 |
| JP | 03184271 | A | 8/1991 |
| JP | 04-149966 | A | 5/1992 |
| JP | 06-275304 | A | 9/1994 |
| JP | 09-115527 | A | 5/1997 |
| JP | 2001-202984 | A | 7/2001 |
| WO | WO 92/09116 | A1 | 5/1992 |
| WO | WO 94/17563 | | 8/1994 |
| WO | WO 95/16287 | A1 | 6/1995 |
| WO | WO 96/17394 | | 6/1996 |
| WO | WO 97/24778 | A1 | 7/1997 |
| WO | WO 99/04446 | A1 | 1/1999 |
| WO | 00/40520 | A1 | 7/2000 |
| WO | WO 01/09059 | A1 | 2/2001 |
| WO | WO-01/20704 | A1 | 3/2001 |
| WO | WO 01/99219 | A1 | 12/2001 |

* cited by examiner

FUEL CELL GAS SEPARATOR

This application claims priority of Australian PS0765/02 filed Feb. 26, 2002 and PCT/AU02/00939 filed Jul. 13, 2002 and PCT/AU03/00235 filed Feb. 26, 2003, the entire contents of which are hereby incorporated by reference.

FIELD OF THE INVENTION

The present invention relates to fuel cells and is particularly concerned with gas separators between adjacent fuel cells, especially solid oxide fuel cells.

BACKGROUND OF THE INVENTION

The purpose of a gas separator in a fuel cell assembly is to keep the oxygen containing gas supplied to the cathode side of one fuel cell separate from the fuel gas supplied to the anode side of an adjacent fuel cell, and to conduct heat generated in the fuel cells away from the fuel cells. The gas separator may also conduct electricity generated in the fuel cells between or away from the fuel cells. Although it has been proposed that this function may alternatively be performed by a separate member between each fuel cell and the gas separator, much development work has been carried out on electrically conductive gas separators.

Sophisticated ceramics for use in fuel cell gas separators have been developed which are electrically conductive, but these suffer from a relatively high fragility, low thermal conductivity and high cost. Special metallic alloys have also been developed, but it has proved difficult to avoid the various materials of the fuel cell assembly and the interfaces between them degrading or changing substantially through the life of the fuel cell, particularly insofar as their electrical conductivity is concerned, because of the tendency of different materials to chemically interact at the high temperatures that are required for different operation of a solid oxide fuel cell. For example, most metallic gas separators contain substantial quantities of the element chromium, which is used to impart oxidation resistance to the metal as well as other properties.

It has been found that where chromium is present in more than minute quantities it may combine with oxygen or oxygen plus moisture to form highly volatile oxide or oxyhydroxide gases under conditions that are typical of those experienced in operating solid oxide fuel cells. These volatile gases are attracted to the cathode-electrolyte interface where they may react to form compounds that are deleterious to the efficiency of the fuel cell. If these chromium reactions are not eliminated or substantially inhibited, the performance of the fuel cell deteriorates with time to the point where the fuel cell is no longer effective.

Several of these metallic alloys and one proposal for alleviating this problem are described in our patent application WO96/28855, in which a chromium-containing gas separator is provided with an oxide surface layer that reacts with the chromium to form a spinel layer between the substrate and the oxide surface layer and thereby tie in the chromium. However, these specialist alloys remain expensive for substantial use in fuel cell assemblies and it would be preferable to have a lower cost alternative.

Special stainless steels have also been developed that are stable at high temperature in the atmospheres concerned, but they generally contain substantial amounts of chromium to provide the desired oxidation resistance, and special coatings or treatments are required to prevent the chromium-based gases escaping from a gas separator formed of these steels. Another approach to a heat resistant steel gas separator is described in our patent application WO 99/25890. However, all of these heat resistant steels are specialist materials and their cost will remain high unless substantial amounts can be produced. Furthermore, the thermal and electrical conductivities of heat resistant steels are low relative to many other metals and alloys, for example 22-24 W/m.K compared to 40-50 M/m.k for the Siemens-Plansee alloy described in WO96/28855. To compensate for this, the thickness of the steel gas separator has to be increased, increasing the mass and cost of a fuel cell stack.

In yet another proposal, disclosed in our patent application WO 00/76015, we have found that copper-based gas separators may be successfully utilized in solid oxide fuel cell assemblies without poisoning the anode. Such a gas separator member comprises a layer of copper or copper-based alloy having a layer of oxidation-resistant material on the cathode side.

One of the major difficulties with developing a satisfactory gas separator is ensuring that its coefficient of thermal expansion ("CTE") is at least substantially matched to that of the other components of the fuel cell assembly. For example, solid oxide fuel cells comprising an oxide electrolyte with a cathode and an anode on opposed surfaces operate at temperatures in excess of 700° C., and the alternating gas separators and fuel cells are generally bonded or otherwise sealed to each other. Thus, any substantial mismatch in the CTE between the two components can lead to cracking of one or both of them, with resultant leakage of the fuel gas and oxygen-containing gas across the component or components, and eventually to failure of the fuel cell stack.

A particular difficulty with developing a suitable fuel cell gas separator is providing a material that provides all four functions of separating the fuel gas on one side from the oxygen-containing gas on the other side, being thermally conductive, having a CTE substantially matched to that of the other fuel cell components, and being electrically conductive.

In order to meet these requirements, it has been proposed to provide a gas separator plate formed principally of a material that may not be electrically conductive, or not adequately electrically conductive, but that meets the other requirements, and to provide electrically conductive feedthroughs through the thickness of the separator. One such proposal is made in Kendall et al. in *Solid Oxide Fuel Cells IV*, 1995, pp.229-235, in which the plate is formed of a zirconia material and lanthanum chromite rivets extend through holes in the plate. Another proposal for electrically conductive feedthroughs through the thickness of the separator plate is made in EP 0993059. In this proposal, a ceramic gas separator plate, preferably stabilized zirconia, has passages therethrough that in the preferred embodiment are filled with cathode material from the cathode side and with anode material from the anode side. Alternatively, they may be filled with a single material composition such as doped chromite, silver-palladium or Plansee alloy.

Thus, the feedthrough material is different to that of the principal separator material and will generally have a higher electrical conductivity. However, as the gas separator is subjected to thermal cycling, this can lead to the disadvantage of the feedthrough material becoming loose in the plate material, due to their different CTEs, and to the leakage of gas through the passages in which the feedthroughs are formed.

Additionally in EP 0993059, individual contacts for the feedthroughs of, for example, Ni, Plansee metal or Ag—Pd on the anode side and Ag—Pd or lanthanum strontium manganite on the cathode side, are bonded to the respective electrode by means of a bond layer that overlies the entire electrode surface. Such a bond layer will tend to inhibit free gas flow through the electrode and the individual contacts must be located very accurately on the electrodes to overlie the respective feedthrough when the fuel cell plates carrying the electrodes and the individual contacts are assembled with the gas separator plates An alternative proposal published in U.S. Patent Application 20020068677 on 6 Jun. 2002 includes a gas separator plate in which the principal plate material is a high silica glass matrix having a metal conductor incorporated therein formed of a material such as silver, Ag—Pd alloy, gold and ferritic stainless steel.

An aim of the present invention is to provide a fuel cell gas separator that alleviates the above mentioned disadvantages.

SUMMARY OF THE INVENTION

According to a first aspect of the present invention there is provided a fuel cell gas separator comprising a first layer which is formed of a material that is impermeable to gases, a second layer which is formed of a material that is impermeable to gases, the first and second layers having perforations through their thickness which are closed by electrically conductive plug material, and a third intermediate layer between the first and second layers which is electrically conductive and is in electrical contact with the plug material in the perforations through the first and second layers.

By the present invention, the advantage of separating the electrical conductivity of the gas separator from the principal material of the separator is achieved, and the risk of leakage of gases through the perforations should the plug material become loose is alleviated by providing the intermediate layer between the first and second layers. Advantageously, the plug material and third intermediate layer provide a thermally conductive path for transmission of heat away from the fuel cells on opposite sides.

The materials of the first and second layers of the gas separator are preferably the same, in order to minimize differences in the CTE of the two layers, but this is not essential. The material or materials are preferably selected with a CTE that substantially matches that of the fuel cell components, but any suitable material may be selected, including electrically conductive materials such as metals and alloys. In a solid oxide fuel cell assembly, in which the electrolyte material is preferably a zirconia and may be the principal layer that supports the electrode layers, the material of the first and second layers of the gas separator is advantageously zirconia. The zirconia of the first and second layers may be yttria-stabilized, for example 3 to 10% Y. Alternatively, the zirconia may include other materials while retaining a zirconia-based structure. For example, the zirconia may be a zirconia alumina having up to 15 wt %, or even up to about 20 wt %, alumina. For convenience, all such materials are hereinafter referred to as zirconia.

The thickness of each of the first and second layers of the gas separator is preferably in the range 20 to 250 µm. While a lesser thickness could be used, the layer becomes difficult to manufacture and it becomes more difficult to ensure that the principal material of the layer is dense, that is that it is gas tight to the gases in the fuel cell assembly. Greater thicknesses may be used but are unnecessary, and more preferably the thickness is less than 150 µm in order to minimize the mass and height of the gas separator plate and therefore of a stack of fuel cell assemblies including the gas separator. Most preferably the thickness of each of the first and second layers is in the range of 50 to 100 µm.

The first and second layers may be formed by any suitable means, depending particularly upon their material and the shape of the separator. A gas separator for use with a planar fuel cell will generally be in the form of a plate, that is at least substantially planar, and a planar zirconia first or second layer, for example, may be formed by tape casting the green material and sintering. Suitable manufacturing methods may be readily identified and do not form part of the present invention.

For convenience, the perforations preferably extend perpendicularly through the layers. However, this is not essential and it may be advantageous for the paths of electrically conductive material to be inclined to the perpendicular. In a preferred embodiment, the perforations in the first layer are offset relative to those in the second layer so that any gas that is able to leak through one or more perforations in one of the first and second layers must pass along or across the third intermediate layer and leak through one or more perforations in the other of the first and second layers in order to leak through the full thickness of the gas separator.

The perforations through the first and second layers preferably have a diameter or average cross-sectional dimension in the range of 50 to 1000 µm. The perforations may be formed during manufacture of the respective layer or subsequently, for example by laser cutting. The minimum size of the perforations is a function of the difficulty of forming and filling them with the electrically conductive plug material. More preferably, the average cross-sectional dimension is in the range 200 to 400 µm, for example about 300 µm.

The minimum number of perforations is a function of their size, the electrical conductivity of the plug material and the electrical current to be passed through the gas separator. If the perforations have an average cross-sectional dimension towards the upper end of the preferred range, they may be fewer in number and more widely spaced. This may be advantages in alleviating the risk of leakage through the aforementioned preferred embodiment of the gas separator plate, since the gas may have further to travel between the perforations in the first and second layers, along or across the third intermediate layer. Preferably, the total area of perforations through each of the first and second layers is in the range of 0.1 mm$^2$ to 20 mm$^2$ per 1000 mm$^2$ surface area (on one side only) of an electrode-contacting zone of the layer, more preferably in the range 0.2 mm$^2$ to 5 mm$^2$ per 1000 mm$^2$. In our currently preferred embodiment, there are 19 perforations having an average diameter of about 300 µm through each of first and second layers having an electrode-contacting zone or functional gas separating area of about 5400 mm$^2$. All of these are sealed with plug material to prevent fuel cell gases passing through the layer.

By the term "electrode-contacting zone" as used throughout this specification is meant the portion of each of the first and second gas separator layers that is opposed to and aligned with the respective electrode of the adjacent fuel cell. Any contact of the electrode-contacting zone with the adjacent electrode may be indirect, through interposed current collection and/or gas flow control devices. It will be understood therefore that the use of the term "electrode-contacting zone" does not require that zone of the gas separator layer to directly contact the adjacent electrode.

Advantageously, the electrically conductive plug material in the perforations of each of the first and second layers is the same, and, more conveniently, is the same as the electrically conductive material of the third intermediate layer, but this is not essential. Any suitable conducting material may be utilized for the plugs and for the third intermediate layer including conducting metals, oxides and ceramics. One possible conducting oxide is coobaltite. However, conducting metals are preferred, particularly, for example, Ag, Au, Pt, Ni, alloys containing one or more of these, and other silver-based materials. The preferred material of the third intermediate layer and the preferred plug material is silver or a silver-based material. The silver or silver-based material may be metallic silver (commercially pure), a metallic mixture in which Ag is the major component, or a silver alloy.

Particularly if the fuel cell operating temperature will be higher than about 900° C. above the melting point of the silver, for example up to 1100° C., the silver may be alloyed with any suitable ductile metal or metals having a sufficiently high melting point. Examples of such metals are one or more noble metals such as gold, palladium and platinum. Preferably, there will be no less than 50 wt % Ag present in the alloy. An alternative and cheaper material to combine with the Ag is stainless steel. The Ag and stainless steel may be mixed as powders and sintered together by firing in the perforations through the first and second layers.

The metallic silver, silver mixture or silver alloy electrically conductive material may be introduced to the perforations by any suitable method, including screen or stencil printing a slurry of the metal, mixture or alloy in an organic binder into the perforations, or coating a surface of the first and second layers by, for example, printing, vapour deposition or plating and causing the coated metal, mixture or alloy to enter the perforations.

Most preferably, the electrically conductive material for the plugs and/or the third intermediate layer is a silver-glass composite. This has the advantage of separating the desired level of electrical conductivity of the gas separator from the material of the first and second layers by the use of silver in the perforations, and alleviating the risk of leakage of gases through the gas separator by the use of class in the perforations. The glass in the plugs material and/or in the third intermediate layer may soften at the operating temperature of the fuel cell and, if necessary, can flow with expansion and contraction of the first and second layers as the separator is subjected to terminal cycling. The ductility of the silver facilitates this. The silver-glass composite may effectively be in the form of pure silver or a silver-based material in a glass matrix.

The silver-glass composite preferably comprises from about 10 to about 40 wt % glass, more preferably from 15 to 30 wt % glass. About 10 wt % glass is believed to be the lower limit to provide adequate sealing advantages in the separator, while at a level above about 40 wt % glass there may be insufficient silver in the composite to provide the desired level of electrical conductivity. Potentially, the proportions of silver and glass in the composite may be varied to best suit the CTE of the first and second layers but the major advantages of the composite lie in the ability of the material to deform with expansion and contraction of the separator and to conduct electricity.

The silver-glass composite may be formed by a variety of suitable processes, including mixing glass and silver powders, mixing glass powder with silver salts, and mixing sol-gel glass precursors and silver powder or silver salts. Alternatively, for example, the silver or silver salt may be introduced to the glass matrix after the glass particles have been provided in the principal material of the gas separator, as described hereinafter. The material is then fired. One suitable silver salt is silver nitrate. In a preferred embodiment the glass powder has a particle size of less than 100 μm, most preferably with an average particle size in the range of 13 to 16 μm, and the silver powder has a particle size less than 45 μm. A suitable binder is for example an organic screen printing medium or ink. After mixing and application of the material, it is fired.

The silver in the composite may be commercially pure, a material mixture in which Ag is the major component or, for example, a silver alloy.

Silver may advantageously be used alone in the glass matrix provided the operating temperature of the fuel cell is not above about 900° C., for example in the range 800 to 900° C. There may be some ion exchange of the silver at the interface with the glass that may strengthen the Ag-glass bond and may spread interface stresses.

Particularly if the fuel cell operating temperature will be higher than about 900° C., above the melting point of the silver, for example up to 1100° C., the silver may be alloyed with any suitable ductile metal or metals having a sufficiently high melting point, for example one or more noble metals such as gold, palladium and platinum. Preferably, there will be no less than 50 wt % Ag present in the alloy. If the high melting temperature alloying metal or metals excessively reduces the ability of the silver alloy to bond with the glass by ion exchange at the interface, a lower melting temperature metal such as copper may be also included.

An alternative and cheaper material to combine with the Ag is stainless steel. The Ag and stainless steel may be mixed as powders prior to being combined with the glass.

A variety of different glass compositions can be used with the material of the first and second layers. The glass composition should be stable against crystallisation (for example, less than 40% by volume crystallisation) at the temperatures and cool-down rates at which the fuel cell gas separator will be used. Advantageously, the glass composition has a small viscosity change over the intended fuel cell operating range of, for example, 700 to 1100° C., preferably 800 to 900° C. At the maximum intended operating temperature, the viscosity of the glass should not have decreased to the extent that the glass is capable of flowing out of the separator under its own weight.

Preferably, the glass is low (for example, less than 10 wt %) in or free of fuming components, for example no lead oxide, no cadmium oxide, no zinc oxide, and no or low sodium oxide and boron oxide. The type of glasses that exhibit a small viscosity change over at least the 100° C. temperature range at the preferred fuel cell operating range of 800° C. to 900° C. are typically high silica glasses, for example in the range 55 to 80 wt % $SiO_2$. Such glasses generally have a relatively low CTE. Preferred and more preferred compositions of such a high silica glass, particularly for use with a zirconia gas separator body, are set out in Table 1.

TABLE 1

| Oxide | Preferred Range wt % | More Preferred Range wt % |
|---|---|---|
| $Na_2O$ | 0-5.5 | 0-2.0 |
| $K_2O$ | 8-14 | 8-13.5 |
| MgO | 0-2.2 | 0-0.05 |
| CaO | 1-3 | 1-1.6 |
| SrO | 0-6 | 0.5-1 |
| BaO | 0-8 | 0-4.4 |
| $B_2O_3$ | 6-20 | 6-20 |
| $Al_2O_3$ | 3-7 | 3-6.0 |
| $SiO_2$ | 58-76 | 6.0-75 |
| $ZrO_2$ | 0-10 | 0-5.0 |

The composite electrically conductive material may be introduced to the perorations by any suitable means. For example, after the glass powder or particles have been introduced to the perforations of a silver salt or very fine suspension of the silver material, for example as a liquid coating applied to one or both surfaces of each of the first and second layers, may be permitted or caused to be drawn through the glass particles in the perforations, such as by capillary action. Alternatively, the solution or suspension could be injected in. More preferably, a mixture of the glass and silver material powders in a binder is printed, for example by screen or stencil printing, onto one or both surfaces of each of the first and second layers to at least partly fill the perforations. The mixture is then heated to melt the glass and sinter the silver. The molten glass-silver composite then flows in the perforations to seal them. A suitable heating/firing temperature is dependent upon the glass composition and the silver material but is preferably in the range 650 to 950° C. for pure silver in a high silica glass matrix for optimum melting of the glass without undue evaporation of the silver.

Instead of introducing the plug material to the perforations as described above, more preferably the plug material is introduced in the manner described below with reference to the second aspect of the invention.

Preferably, the third intermediate layer has a thickness in the range 10 to 500 µm, but advantageously the thickness is towards the lower end of the range in order to minimize the mass and height of the gas separator. More preferably, therefore, the thickness of the third intermediate layer is in the range 10 to 100 µm, most preferably less than 60 µm.

The total thickness of the first, second and third layers (i.e. excluding any surface formations on the first and second layers) is preferably no more than 500 µm. Most preferably the thickness is substantially less than this in order to minimize the overall height and mass of a full cell stack utilizing the gas separator plates, for example no more than 200 µm.

The third intermediate layer may be formed by any suitable means, for example by sputtering, screen printing, tape casting or otherwise coating onto one of the first and second layers as described above, after which the other of the first and second layers is superposed onto the third intermediate layer. Alternatively, third intermediate layer material may be coated on to both of the first and second layers, with the first and second layers then being superposed to form the intermediate layer. Either of these coating procedures may be used to also plug the perforations in one or both of the first and second layers, if the material of the intermediate layer is the same as the plug material. Preferably, the third intermediate layer is initially laid with a relatively greater thickness than the final thickness and is subsequently compressed between the first and second layers to densify the third intermediate layer such that it will not permit the transmission of the gases in the fuel cell assembly. Such pressure may be used to force the material of the third intermediate layer into the perforations of the first and second layers.

Thus, according to a second aspect of the present invention there is provided a method of forming a fuel cell gas separator which comprises:
  providing first and second layers of the gas separator, said first and second layers being formed of material that is impermeable to gases and having perforations through their thickness;
  superposing the first and second layers with a third layer of electrically conductive material having a first thickness interposed between the first and second layers;
  compressing the superposed first, second and third layers under conditions which cause the electrically conductive material to flow to produce a gas separator plate in which the third layer of electrically conductive material has a second thickness less than the first thickness and said electrically conductive material has flowed into the perforations in the first and second layers to plug said perforations.

The method of the second aspect of the invention may be performed at a temperature at which the electrically conductive material flows at the pressure used in the method.

Preferably, the method of the second aspect of the invention includes forming or orienting the first and second layers such that the perforations through said layers are not coincident.

In order to ensure that the fuel cell gas separator does transmit electricity from the fuel cell on one side to the fuel cell on the other side, the electrically conductive plug material in the perforations may extend to the exposed face of the respective one of the first and second layers. Alternatively, the plug material may have an electrically conductive coating on it which extends to the exposed surface and which may protect the plug material and/or the interface between the gas separator and the adjacent electrode. Such a coating will depend upon the plug material and will also depend upon to which electrode the respective first or second layer is exposed. For example, for a silver or silver-based plug material, a Ni or Pt protective coating may be provided at the anode side, optionally with an undercoating of Ag, and Ag or Ag alloy such as Ag—Sn protective coating may be provided at the cathode side. An Ag—Sn protective coating at the cathode side will particularly alleviate loss of the aforementioned silver-glass composite plug material through evaporation or "Nicking" to other nearby components. In particular, the coating may alleviate loss of the glass in the silver-glass composite to the adjacent fuel cell electrode or other porous component by capillary action at the fuel cell operating temperature. The coatings also enhance electrical contacts and provide a degree of compliance. Compliance may be provided by the coatings acting to distribute uneven loads due to components of a fuel cell assembly or stack having slightly different heights.

To enhance electrical current flow between the adjacent fuel cell and gas separator, the aforementioned protective coatings advantageously extend across the electrode-contacting zones of the separator. The preferred coating of nickel, preferably commercially pure nickel, on the anode-facing side may have a thickness in the range of about 10 to 1000 µm, preferably 60 to 100 µm. To ensure continued contact of the Ni layer with the respective one of the first and second layers during extended thermal cycling of the fuel cell stack, particularly where the material of the first or second layer is zirconia, a layer of silver preferably commercially pure Ag, may be disposed on the electrode-contacting zone between the coating of nickel and the anode-facing side of the first or second layer. Such a layer of silver may have a thickness in the range of about 10 to 1000 µm, preferably 20 to 200 µm, and conveniently provides enhanced compliance of the overall coating on the anode side due to its ductility.

An Ag—Sn alloy coating on the cathode-facing side of the first or second layer preferably contains from about 4 to about 20 wt % Sn, and may have a thickness in the range of about 10 to 1000 µm, preferably 100 to 150 µm.

The Ag—Sn alloy coating may have a surface layer of $SnO_2$, formed for example in the oxidising atmosphere on the cathode-facing side of the gas separator. The $SnO_2$ surface layer alleviates loss of Ag by "evaporation" at the elevated temperatures of use of the gas separator. To improve the electrical conductivity of the coating on the cathode-facing side, the coating can include up to about 10 wt % of dopants such as Pd and La. Each of the coating layers may be applied by any suitable means, including screen printing, spin coating, a vapour deposition process such as magnetron sputtering, slurry coating and tape casting.

As an alternative to the Ag—Sn coating, a layer of silver may be formed on the cathode-facing side of the separator body. The silver coating on the cathode side may have a thickness of 10 to 1000 μm, preferably 50 to 250 μm.

Alternatively or in addition to the aforementioned coatings, a respective mesh or other current collector may be interposed between the gas separator and the electrodes of the adjacent fuel cells. The mesh or other current collector may define, or partly define, gas passages through which the air or other oxygen-containing gas on the cathode side of the gas separator and the fuel gas on the anode side of the gas separator is passed over the adjacent fuel cell electrode.

Alternatively, or in addition, to the aforementioned gas flow passages defined or partly defined by a current collector, surface formations may be provided on the electrode-contacting zones of the gas separator to define gas flow passages. The surface formations may be in the form of parallel ridges which may be integrally formed in the material of the first and second layers, or may be affixed to the surfaces of the first and second layers. The surface formations may have any suitable height to provide for the necessary gas flow, for example up to about 750 μm, preferably about 500 μm high.

Advantageously, in one embodiment, the plug material-filled perforations are covered by an array of parallel ridges on both sides of the separator, which extend parallel to the desired direction of the gas flow. The ridges on opposed sides of the gas separator may extend parallel to each other or perpendicularly to each other, depending upon whether the fuel gas and oxygen-containing gas are to be in co- or counter-flow, or in transverse—or cross-flow. The ridges may be formed of any suitable material that is electrically conductive and structurally and chemically stable in the fuel cell operating environment. In one embodiment, the ridges are conveniently bonded to the aforementioned Ni and silver or Ag—Sn coatings on the separator, or possibly through the Ni coating to the Ag undercoating if it is present. The ridges on each side of the gas separator are conveniently made of the same material as the respective electrode that they contact. Thus, on the cathode side the ridges may be formed of a conductive perovskite such as lanthanum strontium manganate, preferably coated with a metallic silver coating up to about 100 μm, preferably about 50 μm, thick. On the anode side, the ridges may be formed of a nickel-zirconia cermet, preferably with a metallic nickel coating up to about 100 μm, preferably about 50 μm, thick.

BRIEF DESCRIPTION OF THE DRAWINGS

Various embodiments of a fuel cell gas separator plate in accordance with the invention will now be described by word of example only with reference to the accompanying drawings in which.

DETAILED DESCRIPTION OF THE DRAWINGS

Figure 1:
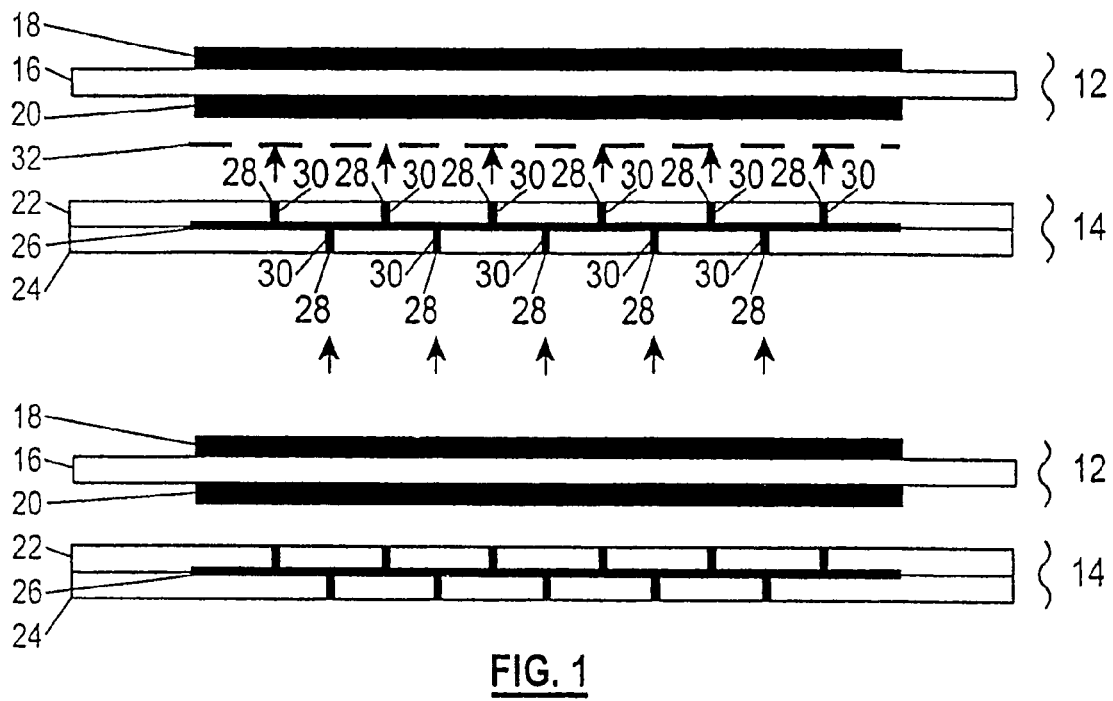
FIG. 1 is a schematic exploded side view of a fuel cell stack incorporating one embodiment of a gas separator plate in accordance with the invention.

Referring to FIG. 1 there is shown an array 10 of alternating fuel cells 12 and gas separator plates 14 in accordance with the invention. The fuel cells 12 are planar and comprise a solid oxide electrolyte support layer 16 with an anode layer 18 on one side and a cathode layer 20 on the other side. The electrolyte is preferably a yttria-stabilized zirconia such as 3Y, 8Y or 10Y. The anode is preferably a nickel-zirconia cermet and the cathode is preferably a conductive perovskite such as lanthanum strontium manganate. Such solid oxide fuel cells are well known and will not be described further.

Each gas separator plate 14 has a three-layer sandwich structure with first and second outer layers 22 and 24, and a third intermediate layer 26.

The first and second layers are conveniently formed of a zirconia to substantially match the CTE of the electrolyte support layer 16 of the fuel cells 12. The zirconia may be yttria-stabilized, but could be, for example, an alumina-added zirconia with up to 20 wt. % alumina.

The zirconia is not electronically conductive, and each of the first and second layers 22 and 24 has a plurality of perforations 28 extending perpendicularly through its thickness which are filled with an electrically conductive plug material. The plug material is conveniently a silver-based material such as commercially pure silver, a silver alloy or a composite of silver in glass. In the preferred embodiment, the plug material is a composite of 80 wt % silver in glass. The silver is commercially pure and the glass has a composition of 0.8-1.2 wt % $Na_2O$, 8.9-9.2 wt % $K_2O$, <0.1 wt % MgO, 1.4-1.5 wt % CaO, <0.1 wt % SrO, 3.1-4.2 wt % BaO, 7.2-10.2 wt % $B_2O_3$, 6.2-6.6 wt % $Al_2O_3$, and 68.8-70.4 wt % $SiO_2$.

The perforations 28 in the first and second layers in each gas separator plate 14 are offset so that no perforation in the first layer is coincident with a perforation in the second layer. The material of the third intermediate layer 26 is the same as the plug material in the first and second layers, and has a thickness of less than 60 μm.

The perforations have an average cross-sectional dimension of about 300 μm, and the plug material 30 seals the perforation to present a total cross-sectional area of plug material in the range of 0.2 to 5 $mm^2$ per 1000 $mm^2$ of surface area of the electrode-contacting zone on one side only of each of the first and second layers.

Figure 2:
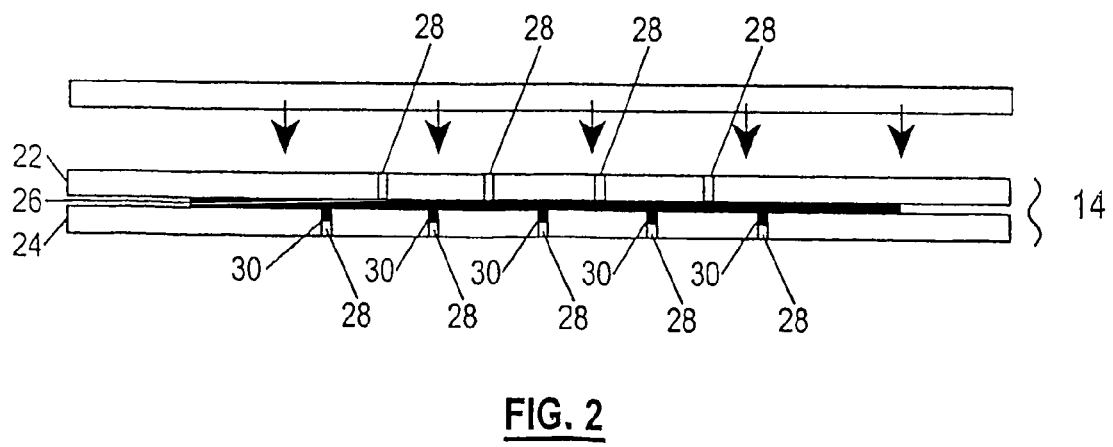
FIG. 2 is a schematic side view of one of the fuel cell gas separator plates of FIG. 1 during its manufacturing process.

FIG. 2 illustrates one method of forming the gas separator plate 14. In this method, a thicker layer of the material of the third intermediate layer, for example about 200 μm, is screen printed onto the inner surface of the second layer 24. The screen printing may be performed at or near room temperature. The precursor is a mixture formed by mechanical agitation of powdered glass having a particle size of less than 100 μm and an amperage size range of 13 to 16 μm and silver metal powder having a particle size range of less than 45 μm hinder. A suitable binder system is a combination of a screen printing inks available under the brand name CERDEC and DURAMAX.

As shown in FIG. 2, some of the coated material enters the perforations 28 in the second layer during the coating process. The first layer 22 is then superposed onto the coated material of the third layer on the second layer, with the perforations 28 in the first lager offset relative to the perforations 28 in the second layer. Sufficient pressure is then applied through the first layer 22, as represented by the downwards arrows in FIG. 2, to cause the material to flow. This reduces the precursor material of the third layer to the desired thickness and forces the composite material further into the perforations 28 of the second layer 24 as well as into the perforations 28 in the first layer 22 to act as the electrically conductive plugs. The gas separator plate is then fired at a temperature of about 850 to 920° C. to melt the glass and sinter the silver into a continuous electrically conductive path in the glass matrix. At the operating temperature of the fuel cell, the glass in the composite is a viscous fluid and forms a gas barrier, while the silver provides the electrical conductivity. At low temperatures, or at shutdown, the molten-viscous glass in the composite returns to a solid/rigid state. Should the composite material become damaged ill this condition, once it returns to operating temperature the glass returns to a fluid state and will recover its sealing properties.

A similar forming process may be adopted when the electrically conductive material comprises silver metal, a silver mixture or silver alloy, with the metal or alloy powder or powders being formed into a slurry and screen printed.

The outer surfaces of the gas separator plate 14 are then coated with conductive layers of an Ag—Sn alloy on the cathode side and nickel metal on the anode side, optionally with a layer of silver between the anode side and the nickel coating, to protect the electrically conductive paths. A layer of $SnO_2$ may overlie the Ag—Sn coating. The ductility of the coatings may alleviate stresses arising from uneven load distribution in the fuel cell stack due to slightly, different heights of the components. The coatings may also act to fill the perforations 28 from the outside and alleviate wicking of the glass into adjacent porous layers of the fuel cell stack, so as to ensure that electrically conductive paths are provided via the perforations and the third intermediate layer from one of the outer surfaces to the other outer surface of the gas separator plate 14, as represented by the upwards arrows in FIG. 1. Additional detail on the application processes for the coatings is given below.

Referring to FIG. 1 again, one current collector 32 is illustrated schematically between the upper pair of fuel cell 12 and gas separator plate 14, and this may define gas flow passages between the two structures. Such gas flow passages are necessary between each pair of adjacent gas separator plates and fuel cells, but are omitted from FIGS. 1 and 2 for convenience only. They are conveniently in the form of ridges on the outer surfaces of the gas separator plates 14, over any of the aforementioned coatings as illustrated in and described with reference to FIGS. 3 to 9.

Figure 3:
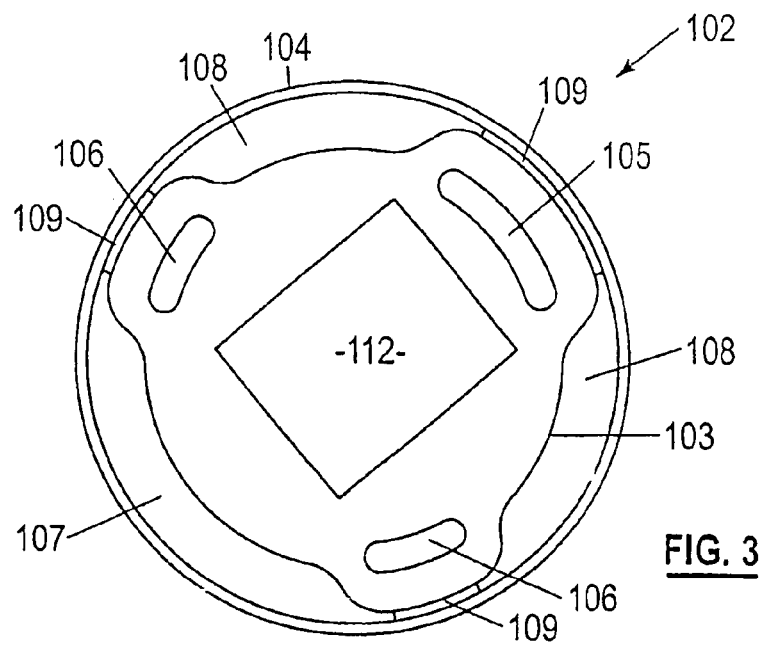
FIG. 3 is a plan view of a fuel cell stack incorporating another embodiment of gas separator plates in accordance with the invention.
Figure 4:
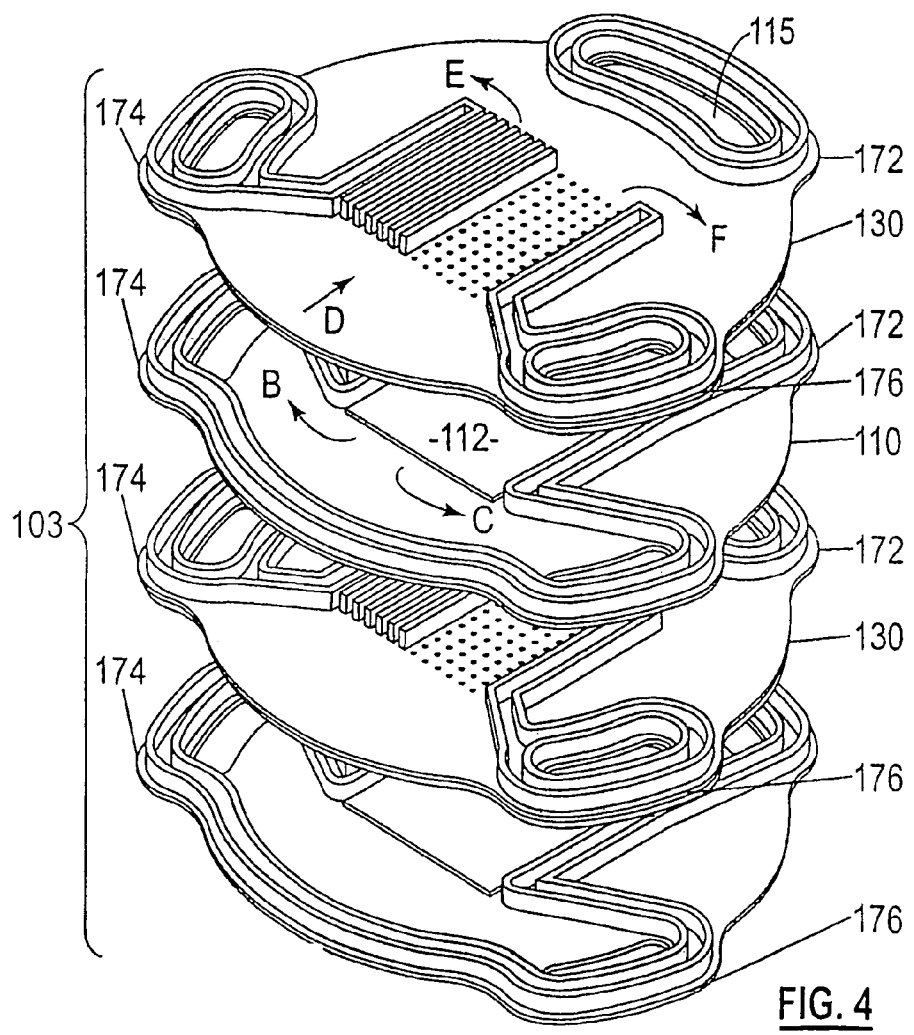
FIG. 4 is an exploded schematic perspective view looking downwards and illustrating the general orientation of cell plates and gas separator plates within the stack shown in FIG. 3.
Figure 5:
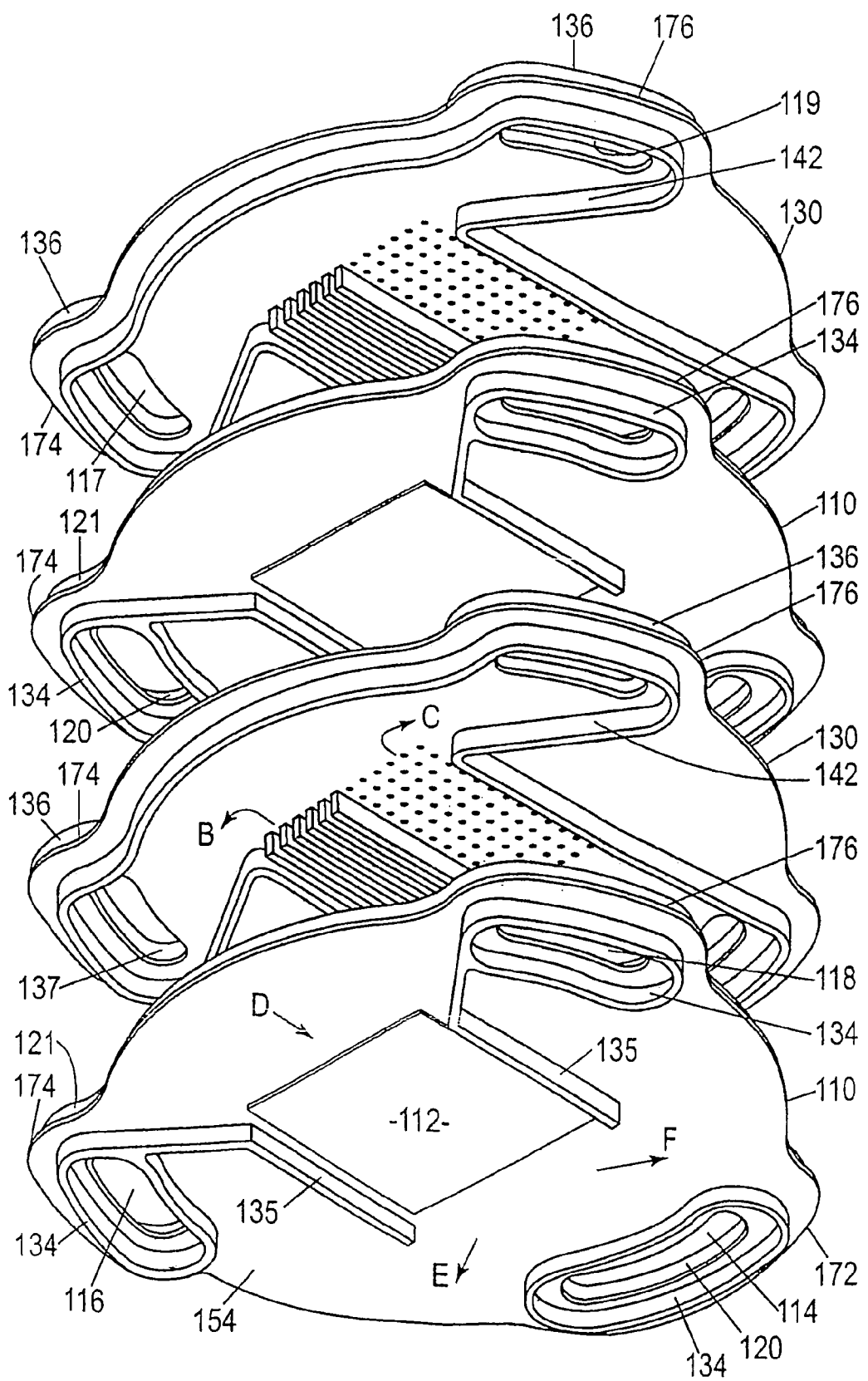
FIG. 5 is a schematic perspective view looking upwards at the cell plates and gas separator plates in the same exploded positions shown in FIG. 4.

Referring to FIGS. 3, 4 and 5 a solid oxide fuel cell stack assembly 102 comprises a stack 103 of alternating fuel cell components, in the form of cell plates 110 and gas separator plates 130 held within a tubular housing 104. All of the cell plates 110 are identical and all of the separator plates 130 are identical. As with the plates in FIGS. 1 and 2, typically there might be 20 to 500 of each of these plates in the stack 103. Fuel gas and air are supplied at one axial end of the stack assembly and exhaust gases are collected at the other end in a co-current manifolding system. Either end is suitable for the supply and exhaust functions, but the manifold system may alternatively be counter-current. In the described concurrent embodiment, the fuel and air supplies are both at the bottom and exhausts are at the top, but in many circumstances it is preferred for the fuel to be supplied from the bottom and the air to be supplied from the top in a counter-current arrangement. Alternatively, all of the gas supplies and exhausts may be at the same end.

Referring to FIGS. 3 to 8, each cell plate 110 has a substantially central, square anode layer on an upper face of the electrolyte-based cell plate and a substantially central, square cathode layer on a lower face of the cell plate to form a substantially square fuel cell 112.

The cell plates 110 and separator plates 130 have the same outer shape, which could be described as generally trilobular, or part way between a circle and a triangle. The shape could alternatively be described as generally circular with three rounded lobes extending therefrom. Two of the lobes 174 and 176 are the same size and the third lobe 172 extends about 50% further than the others circumferentially around the periphery of the plate. At each lobe 172, 174 and 176 a kidney shaped aperture (numbered 114, 116 and 118 in the cell plate and 115, 117 and 119 in the separator plate, respectively) extends through the plate. The larger lobes 172 carry the larger apertures 114 and 115. A system of rib or ridge-shaped seals oil the faces of the plates directs the gas flows within the stack. These seals are described hereinafter in more detail, but it will be appreciated that other types of seals may be utilized including gasket seals.

Fuel distribution and exhaust collection manifolds 105 and 106 respectively, (see FIG. 3) defined by the three aligned series of apertures 114, 115, 116 and 117, and 118 and 119 in the fuel cell and gas separator plates and formed by interlocking seal components of the plates 110 and 130, conduct the fuel inlet and exhaust streams past the air side of the plate on the anode side. Air supply and collection manifolds 107 and 108 respectively are created by three volumes formed between the periphery of the stack 103 and the inside wall of the housing 104. Manifold 107 is formed essentially between the lobes 174 and 176 of the plates, and the two exhaust manifolds 108 are formed essentially between the lobes 172 and 174 and the lobes 172 and 176, respectively, of the plates. Air inlet manifold 107 has an angular extent that is about 50% larger than the each of the two exhaust manifolds 108, and is opposite the fuel inlet or distribution manifold 105. Respective elongate, sliding fibrous seals 109 extend along the stack adjacent the lobes 172, 174 and 176, between the stack 103 and the inside wall of the housing 104 to separate the air supply manifold 107 from the two air collection manifolds 108. The fibrous seals may permit a degree of leakage between the manifolds 107 and 108, but this is not likely to be detrimental to the operation of the stack.

The housing 104 is constructed of a suitable heat resistant steel sheet material which lay be lined with a suitable insulating material, and is lid into position over the stack 103 after the plates 110 and 130 have been assembled together.

In operation of the stack, fuel gas flows up through the longer aperture 114 defining an inlet port in each cell plate 110 and (at arrow A) across the face of the fuel cell anode, then divides its flow (arrows B and C) to exit up through exhaust port apertures 117 and 119, respectively, in the adjacent gas separator plate 130. On the opposite face of the cell plate 110 air, which has passed up the side of the stack 103 through the inlet manifold 107 between the stack and the housing, flows in (arrow D) from the periphery of the stack 103 and across the face of the fuel cell cathode, in counter-current to the fuel gas flow across the fuel cell anode before dividing its flow to exit (arrows E and F) from the periphery of the stack 103 and then continuing up through the exhaust manifolds 108 to the top of the stack.

Figure 6:
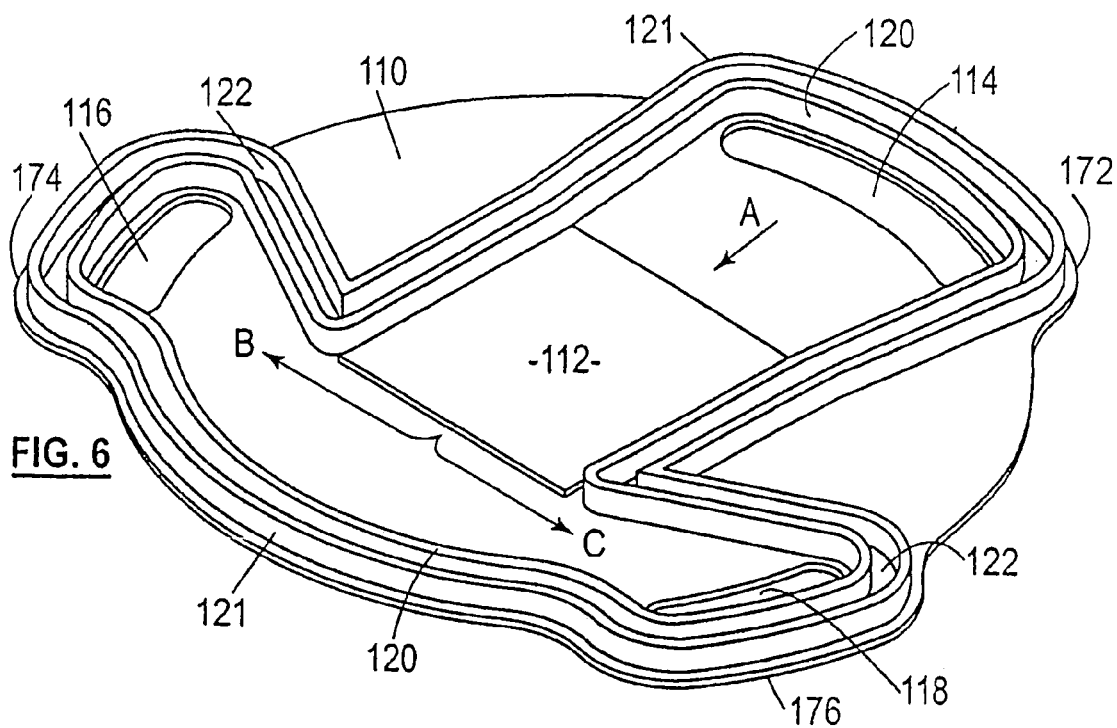
FIG. 6 is a perspective view of the topside of one of the cell plates shown in FIG. 4.

Referring to FIG. 6, the generally planar cell plate 110 used in the stack 103 is shown in greater detail. The square fuel cell 112 on the plate (the anode side is visible) has an electrolyte supported structure with the electrolyte material extending out to form the main body of the plate 110. The electrolyte is preferably a yttria-stabilized zirconia and suitable 3Y, 8Y and 10Y materials are known to those in the art. The anode is preferably a nickel-zirconia cermet and the cathode is preferably a conductive perovskite such as lanthanum strontium manganate. The underside of the cell plate 110 and the cathode are visible in FIG. 5.

A pair of parallel ribs 120 and 121 project from the planar surface 124 of the cell plate 110 forming a valley or groove 122 therebetween. The surface 124 is the upper, anode surface of the cell plate when the stack is oriented for use. The ribs are formed of zirconia and may be integrally formed with the main body of the plate or may be formed separately, for example from a screen printed slurry, and be fired into integral relationship with the main body. Each rib 120 and 121 forms a continuous path or closed loop outwardly of the apertures 114, 116 and 118 through the cell plate and around the perimeter of the region which the fuel gas is permitted to contact. In particular, the closed loop defined by the ribs 120 and 121 is waisted alongside the anode to direct fuel gas from the inlet aperture 114 over the anode.

Figure 7:
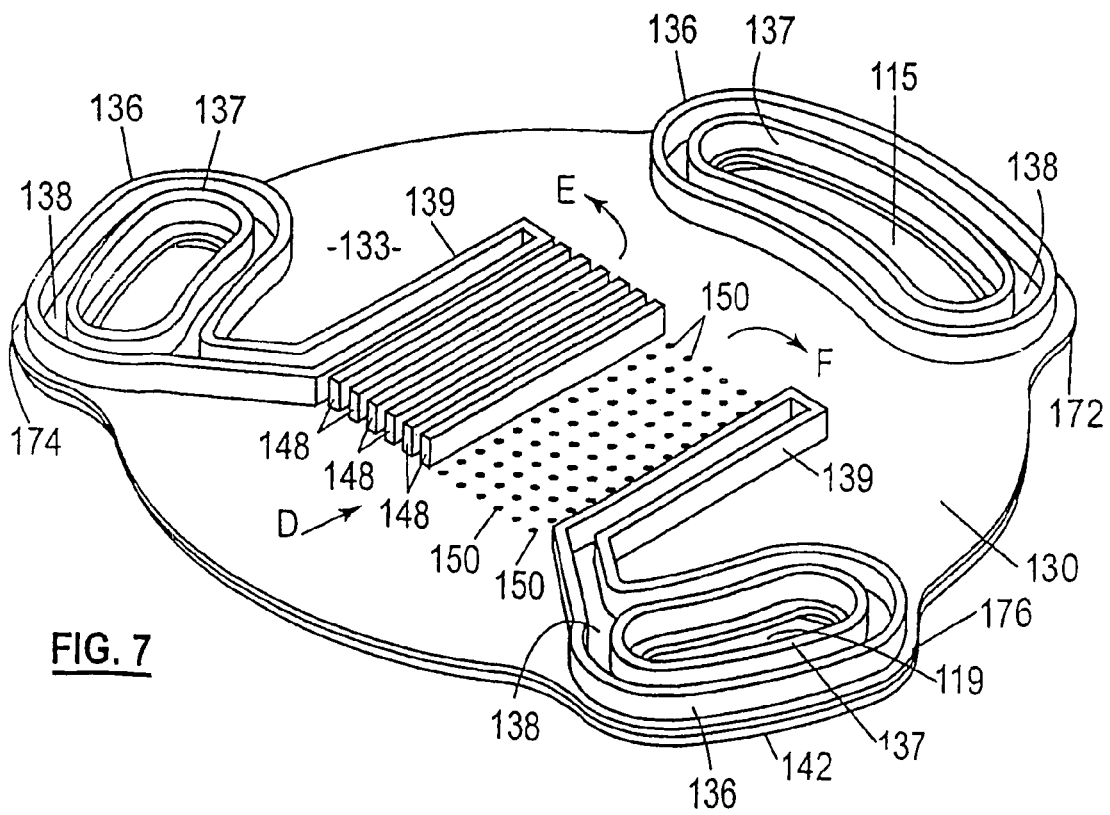
FIG. 7 is a cut-away perspective view of the topside of one of the gas separator, plates shown in FIG. 4.
Figure 8:
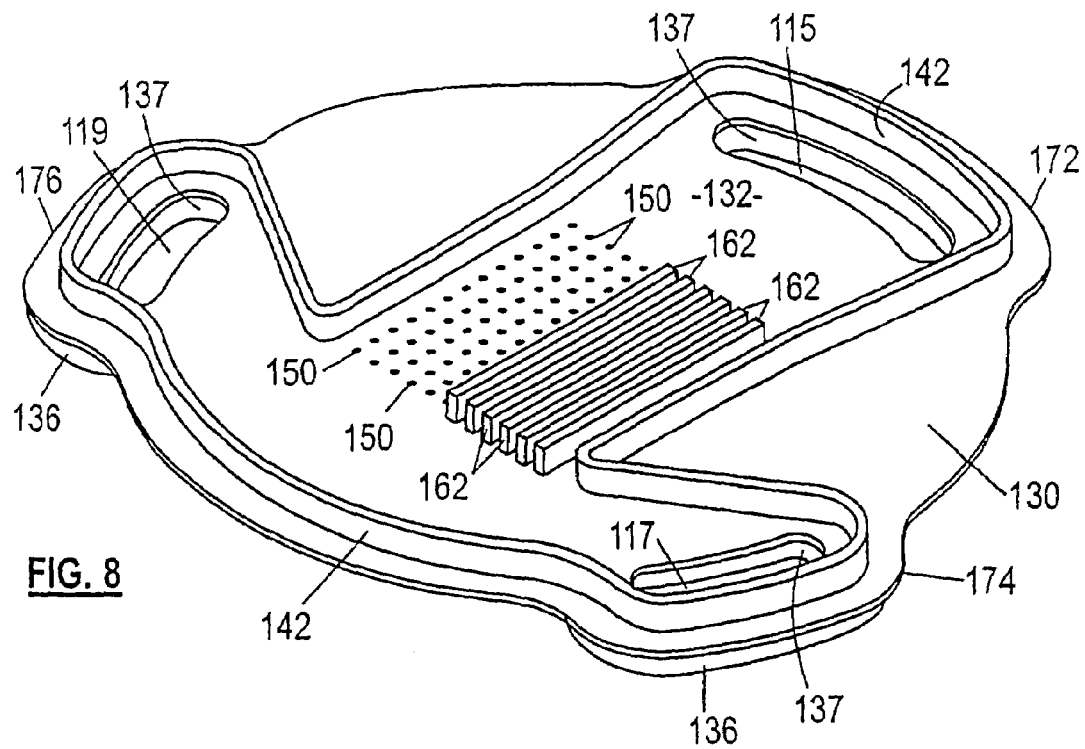
FIG. 8 is a cut-away underside view of the gas separator plate shown in FIG. 7.
Figure 9:
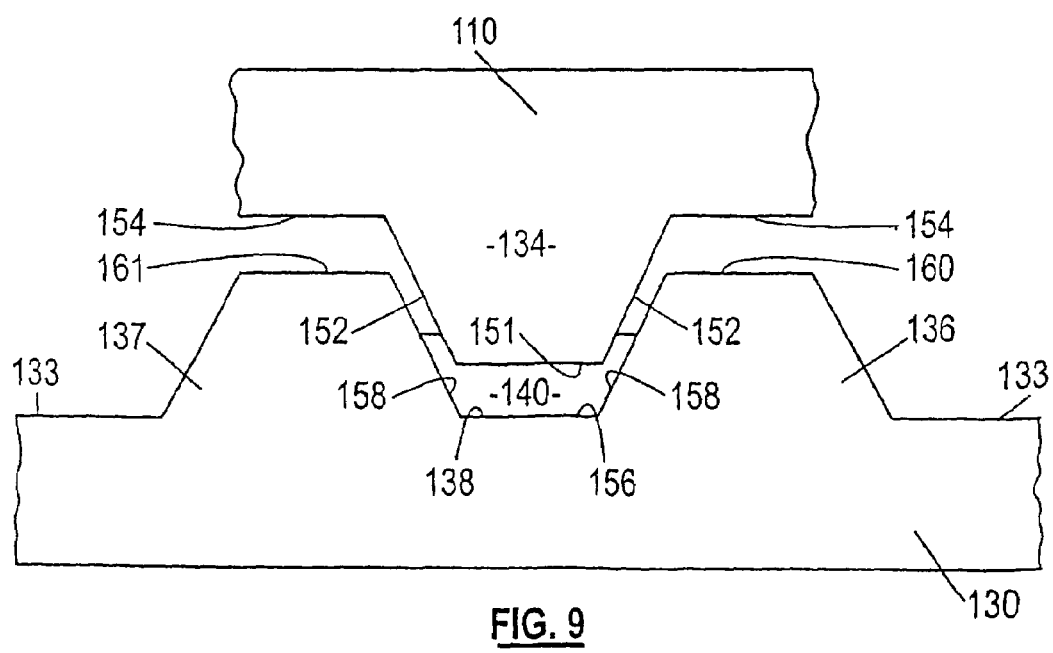
FIG. 9 is a diagrammatic cross-sectional view through a portion of a gas sealed assembly between the plates shown in FIGS. 3 and 4.

In all of FIGS. 3 to 9, the thickness of the plates 110 and 130 and the height of the ribs are shown greatly exaggerated to assist the explanation of the components. In this embodiment, the fuel cell 112 is 2500 mm$^2$, the cell plate is 150 µm thick and the ribs are approximately 500 µm high, 1 mm wide and approximately 2 mm apart. On the lower, cathode side 154 of each fuel cell plate 110, as shown in FIG. 5, a respective single rib 134 (that corresponds to the ribs 120 and 121 in term of size and how it is formed) extends from the planar surface 154 around each of the apertures 114, 116 and 118 through the plate. Each of the ribs 134 around the apertures 116 and 118 has an arm 135 that extends inwardly and towards the aperture 114 (but short thereof) alongside the cathode layer of the fuel cell 112 to assist guidance of incoming air over the cathode. One of the ribs 134 is also shown in FIG. 9 and the use of the rib seals is described with reference to that Figure.

FIGS. 7 and 8 show the planar gas separator plate 130 in greater detail. In FIG. 7, the surface 133 is the upper, cathode-contacting surface of the separator plate 130 when the stack is oriented for use. Respective pairs of parallel ribs 136 and 137 project from the planar surface 133 of the separator plate 130 forming valleys or grooves 138 therebetween. The pairs of parallel ribs 136 and 137 correspond to the ribs 120 and 121 in terms of size, spacing and how they are formed, but extend around the apertures 115, 117 and 119 through the plate 130 to cooperate with the ribs 134 on the cathode-side of the adjacent fuel cell plate 110. The respective ribs 136 associated with the apertures 117 and 119 each have a double-walled arm 139 that is closed at its distal end to cooperate with and receive the arm 135 of the corresponding rib 134.

On the lower, anode-contacting side 132 of each gas separator plate 130, a single rib 142 is shown in FIG. 8 and partly in FIG. 7. The rib 142 corresponds to the ribs 120 and 121 in terms of size and how it is formed, and forms a continuous path outwardly of the apertures 115, 117 and 119 through the plate 130 and around the perimeter of the region that the fuel gas is permitted to contact. The outline of the rib 142 corresponds to the groove 122 between the ribs 120 and 121 on the anode surface of the adjacent fuel cell plate 110 and cooperates with those ribs in forming a seal.

As explained hereinafter, with reference to FIG. 9, glass sealant 140 is used in both of valleys 122 and 138 to form a seal between the ribs.

Each separator plate 130 is manufactured as described with reference to FIGS. 1 and 2 with first and second outer layers formed from a zirconia to substantially match the CTE of the main body of the cell plates 110. This greatly minimizes thermal stresses in the assembly during start-up, operation and shut-down. The zirconia may be yttria-stabilized, but could be, for example, an alumina-added zirconia with up to 20 wt % alumina, preferably up to 15 wt % alumina. A third, intermediate electrically conductive layer is disposed between the outer layers in a sandwich structure.

The zirconia is not electrically conductive, and the outer layers of the separator plate 130 have an array of perforations 150 extending perpendicularly through their thickness that are filled with and extend to the electrically conductive material of the third intermediate layer. These perforations may be formed by laser cutting and occupy a region in the plate 130 which is directly opposite the region occupied by the fuel cell 112 in plate 110. As in FIGS. 1 and 2, the perforations 150 in the first and second layers are offset relative to each other and are connected via the third intermediate layer. The electrically conductive material may be metallic silver (commercially pure) which is plated into the perforations by standard plating or printing techniques. Alternatively, the electrically conductive material may be a silver mixture, a silver alloy or a silver composite, such as a composite of silver, silver mixture or silver alloy in glass. Suitable alloying elements or materials include gold, palladium and platinum. Alternatively, the silver may be mixed with stainless steel, for example as powders prior to sintering in the perforations. In the preferred embodiment, the third intermediate layer is formed with and the perforations are filled with a silver-glass composite of the type and in the manner described with reference to FIGS. 1 and 2.

The perforations have an average cross-sectional dimension of about 300 µm, and the plug material seals the perforations to present a total cross-sectional area of plug material in the range of 0.2 to 5 mm$^2$ per 1000 mm$^2$ of the electrode-contacting zone (measured on one side only of the plate 130). The electrically conductive silver based plug which fills each perforation is plated with a protective Ni coating on the anode side and an Ag or Ag—Sn coating on the cathode side. The coatings extend over the entire electrode contacting zone of the plate. The nickel coating may have an undercoating of Ag to assist the Ni to bond to the separator body and to enhance the compliance of the anode-side coating. An Ag—Sn coating may have an SnO$_2$ surface layer as a result of being oxidized. Such coatings, for example by screen printing of powder materials in a binder and subsequent firing, may act to fill the perforations 150 from the outside so as to ensure that electrically conductive paths are provided via the perforations from one of the outer surfaces to the other outer surface of the gas separator plate. By way of example only, the nickel coating, the Ag undercoating (if present) and the Ag—Sn coating may have thicknesses in the range of 60-100 µm, 20-200 µm and 100-150 µm, respectively. The alternative Ag coating on the cathode side may have a thickness in the range of 50 to 250 µm.

The coating materials may be applied by any suitable process to achieve the required thickness and consistency, including screen printing a paste of the metal, metals or alloy powder made using a suitable binder, spin coating using a suspension of the metal, metals or alloy powder, a physical vapour deposition process such as magnetron sputtering, slurry coating or tape casting.

In a particular embodiment, a nickel coating having a thickness of about 80 μm was formed on the anode side of the electrode-contacting zone by screen printing a paste of Ni powder in a suitable commercially available organic binder with no Ag undercoating, and then firing the Ni layer. Initially, the Ni layer was oxidized on a first firing. During a subsequent firing in a reducing atmosphere such as hydrogen or fuel gas, the Ni oxide was reduced and the Ni layer actively bonded to the electrode-contacting zone on the anode side of the gas separator plate to lower the contact resistance, protect the plug material in the seals, and provide a degree of compliance within the stack as a result of the ductility of the nickel layer.

On the cathode side in the particular embodiment, an Ag—Sn alloy layer having a thickness of about 140 μm was produced on the electrode-contacting zone by screen printing a paste of the alloy powder in an organic binder. The alloy powder contained 8 to 1.0 wt % Sn in Ag. The screen printing was followed by heating the coating to a temperature in the range of 500 to 950° C. in all oxidising atmosphere, during which a Continuous $SnO_2$ surface layer was formed on the coating. As with the nickel layer, the Ag—Sn alloy layer protects the plug material in the perforations, lowers the contact resistance of the gas separator plate and provides a degree of compliance due to its ductility.

An array of parallel ridges 148 is positioned parallel to the air flow stream in the electrode contacting zone on the cathode side 133 of each plate 130. These ridges 148 are each aligned over a corresponding row of perforations 150 and over the Ag—Sn coating. To assist explanation, about half of the ridges 148 have been removed in FIGS. 4 and 7. The ridges 148 perform two major functions. First they provide a conductive path between the plug material in perforations 150 and Ag—Sn coating and the fuel cell 112. Second they provide physical support to brace the thin and fragile cell plate as well as means for distributing gas flows in the narrow spaces between the cell plates and the separator plates. The ridges 148 thus need to be both electrically conductive and structurally stable. The ridges 148 are approximately 500 μm high and could be made from a conductive perovskite, such as the LSM material of the cathode, optionally with a metallic silver coating about 50 μm thick over the ridges.

On the underside of plate 130 (ie. surface 132 shown in FIG. 8), the rows of plugged perforations 150 and the Ni coating are covered by an array of parallel ridges 162 that are positioned parallel to the fuel gas flow stream. Again, about half the ridges 162 are cut away in FIGS. 5 and 8 to assist visualization of the structure. The ridges 162 perform as a current collector whereby current is conducted between the plug material in the perforations 150 and the Ni coating and the anode. They also provide physical support for the cell plate and additionally provide means for directing and distributing gas flows in the narrow spaces between the cell plates and separator plates. The ridges are approximately 500 μm high and could be formed from the same material as the anode, optionally with all overlay (approx 50 μm thick) of nickel.

Referring FIG. 9, a pool of glass sealant 140 is located in the valley 138 between the ribs 136 and 137 and is pressed into by rib 134. Each rib has a tapered profile with oppositely inclined flanks and a distal surface. A similar arrangement applies between the ribs 120 and 121 and rib 142, but will not be described separately. During manufacture, the glass is introduced as a powder and the stack assembled before the stack is heated to melt the glass in order to form the required seal. Thus, no binder is required. In operation of the stack the glass sealant 140 is fully molten but highly viscous and is retained in the valley 138 by one of the following three options not shown in FIG. 9. The glass advantageously has a composition range of 0-0.7 wt % $Li_2O$, 0-1.2 wt % $Na_2O$, 5-15 wt % $K_2O$, 0-2 wt % MgO, 2-8 wt % CaO, 0-2 wt % SrO, 2-12 wt % BaO, 2-10 wt % $B_2O_3$, 2-7 wt % $Al_2O_3$, 50-70 wt % $SiO_2$ and 0-2 wt % $ZrO_2$.

In one embodiment option, the distal surface peak 151 of the rib 134 contacts the floor 156 of the groove 138 leaving at least one of the flanks 152 of the rib 134 clear of the flanks 158 of the groove and leaving the distal surfaces 160 and 161 of ribs 136 and 137 clear of the basal surface 154 of the plate 110. In this case the glass sealant 140 would be retained by surface tension between the spaced flanks 152 and 158.

In a second, and preferred, embodiment option, the distal surfaces 160 and 161 contact the basal surface 154 leaving at least one of the flanks 152 clear of the flanks 158 and the distal surface 151 clear of the floor 156. In this case the sealant 140 would be retained between the distal surface 151 of the rib 134 and the floor 156, with some displaced outwardly to between the spaced flanks 152 and 158.

In a third embodiment option, both flanks 152 would engage corresponding flanks 158 leaving the distal surfaces 160 and 161 clear of the basal surface 154 and the distal surface 151 clear of the floor 156. In this case the sealant 140 would fill the volume between the distal surface 151 and the floor 156.

Figure 10:
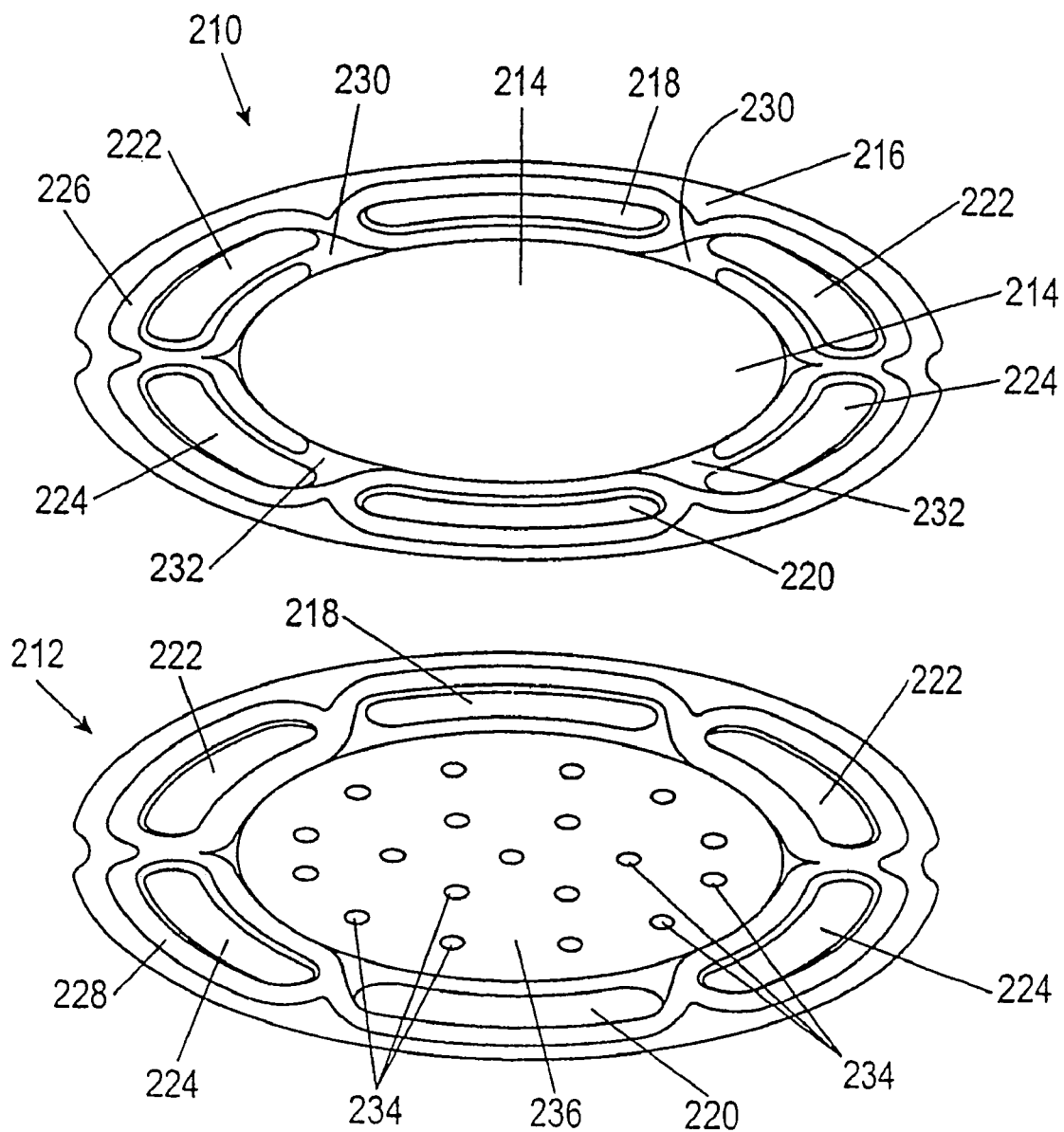
FIG. 10 is an exploded perspective view of another embodiment of gas separator plate in accordance with the invention, shown with one of two associated fuel cell plates.

Referring now to FIG. 10, there is shown (in exploded manner) a fuel cell plate 210 superposed over a gas separator plate 212. In use, the plates 210 and 212 are in at least substantially face to face contact and there would be a stack of alternating fuel cell plates 210 and gas separator plates 212.

The plates 210 and 212 are seen in perspective view from above with a cathode layer 214 visible on an electrolyte layer 216 on the fuel cell plate 210. An anode layer (not visible) corresponding to the cathode layer 214 is provided on the underside (in the drawing) of the fuel cell plate.

The fuel cell and gas separator plates 210 and 212 are generally circular and are internally manifolded with a fuel inlet opening 218, a fuel outlet opening 220, air inlet openings 222 and air outlet openings 224, which respectively align when the plates are stacked. A gasket-type seal 226 and 228, respectively, is provided on the upper face (in the drawing) of each of the fuel cell and gas separator plates 210 and 212. The gasket-type seals 226 and 228 are conveniently formed of a glass composition or a glass composite.

The seal 226 has air inlet ports 230 associated with the air inlet passages and air outlet ports 232 associated with the air outlet passages 224 to permit air to flow across the cathode layer 214 between the cathode and the adjacent gas separator plates (not shown). The seal 226 extends wholly around the fuel inlet passage 218 and outlet passage 220 to prevent fuel flowing over the cathode side of the fuel cell plate 210.

Correspondingly, the seal 228 on the gas separator plate 212 extends wholly around the air inlet passages 222 and the air outlet passages 224, but only around the exterior of the fuel inlet passage 218 and outlet passage 220 so that fuel gas can flow from the fuel inlet passe 218, across the anode, between the fuel cell plate 210 and adjacent gas separator plate 212, before exiling through the fuel outlet passage 220.

Means (not shown) is provided to distribute the reactant gas across the respective electrode and to provide support for all of the plates 210 and 212 in a fuel cell stack. Such means may be in the form of surface formations oil the gas separator plate 212, for example as described with reference to FIGS. 3 to 9, or on the fuel cell plate 210. Alternatively, the gas may be distributed by a separate member between the plates, such as a mesh or corrugated structure, that may also act as a current collector.

As before, the cathode material is preferably a conductive perovskite such as lanthanum strontium manganate that is porous, and the anode is preferably formed of a porous nickel-zirconia cermet.

The electrolyte layer 216 is preferably a yttria-stabilized zirconia such as 3Y, 8Y or 10Y and extends beyond the electrode layers to define the internally manifolded fuel and air inlet and outlet passages therethrough, to support the seal 226 and to provide a contact surface for the seal 228 on the gas separator plate 212.

The gas separator plate has a similar profile to the fuel cell plate 210 and has a sandwich structure of zirconia outer layers to substantially match the CTE of the electrolyte layer 216 of the fuel cell and an electrically conductive third intermediate layer. The zirconia of the gas separator plate 212 may be yttria-stabilized, but could be, for example, an alumina-added zirconia with up to 20 wt. % alumina.

Since the zirconia of the outer layers is non-electrically conductive and one of the functions of the gas separator plate 212 is to transmit electrical current from one fuel cell to the next through the stack, offset electrically-conductive passages 234 are provided through the thickness of a planar central portion or electrode-contacting zone 240 of the outer layers corresponding in shape and size to the adjacent electrode to connect with the third intermediate layers. The passages 234 comprise substantially perpendicular perforations through the outer layers of the plate 212 containing a silver or silver based material provided, along with the third intermediate layer, as described with reference to FIGS. 1 to 9. Although the passages 234 through the gas separator plate 212 are illustrated as visible, they would be covered with an electrically-conductive coating across the central portion 236 on each side, also as previously described herein.

Whilst the above description includes the preferred embodiments of the invention, it is to be understood that many variations, alterations, modifications and/or additions may be introduced into the constructions and arrangements of parts previously described without departing from the essential features or the spirit or ambit of the invention.

It will be also understood that where the word "comprise", and variations such as "comprises" and "comprising", are used in this specification, unless the context requires otherwise such use is intended to imply the inclusion of a stated feature or features but is not to be taken as excluding the presence of other feature or features.

The reference to any prior art in this specification is not, and should not be taken as, an acknowledgment or any form of suggestion that such prior art forms part of the common general knowledge.

The invention claimed is:

1. A fuel cell gas separator comprising a first layer which is formed of a material that is impermeable to gases, a second layer which is formed of a material that is impermeable to gases, the first and second layers having perforations through their thickness which are closed by electrically conductive plug material, and a third intermediate layer between the first and second layers which is electrically conductive and is in electrical contact with the plug material in the perforations through the first and second layers, wherein said third intermediate layer is comprised of an electrically conductive material selected from the group consisting of electrically conductive metal alloys, metals, metal oxides, ceramics, and glass composites.

2. The gas separator according to claim 1, wherein the materials of the first and second layers are the same.

3. The gas separator according to claim 1, wherein the material of each of the first and second layers is zirconia.

4. The gas separator according to claim 3, wherein the zirconia is yttria-stabilised.

5. The gas separator according to claim 3, wherein the zirconia contains up to about 20 wt. % alumina.

6. The gas separator according to claim 1, wherein the thickness of each of the first and second layers is in the range 20 to 250 µm.

7. The gas separator according claim 1, wherein the thickness of the third intermediate layer is in the range 10 to 100 µm.

8. The gas separator according to claim 1, wherein the electrically conductive material of the third intermediate layer is selected from the group consisting of cobaltite, Ag, Au, Pt, Ni, alloys containing one or more of said metals, and other silver-based materials.

9. The gas separator according to claim 1, wherein the material of the third intermediate layer is the same as the electrically conductive plug material.

10. The gas separator according to claim 1, wherein the perforations extend perpendicularly through the thickness of the first and second layers.

11. The gas separator according to claim 1, wherein the perforations in the first layer are offset relative to the perforations in the second layer.

12. The gas separator according to claim 1, wherein each perforation has an average cross-sectional dimension in the range of 50 to 1000 µm.

13. The gas separator according to claim 1, wherein the total area of the perforations through each of the first and second layers is in the range of 0.1 to 20 $mm^2$ per 1000 $mm^2$ surface area of an electrode-contacting zone of said layer.

14. The gas separator according to claim 1, wherein the electrically conductive plug material is selected from the group consisting of cobaltite, Ag, Au, Pt, Ni, alloys containing one or more of said metals, and other silver-based materials.

15. The gas separator according to claim 14, wherein the electrically conductive plug material is selected from the group consisting of metallic silver, a metallic mixture in which Ag is the major component, a silver alloy and a silver-glass composite.

16. The gas separator according to claim 15, wherein the electrically conductive plug material is silver alloyed or mixed with any one or more of gold, palladium, platinum or stainless steel.

17. The gas separator according to claim 15, wherein the electrically conductive plug material is a silver-glass composite containing from about 10 to about 40 wt % glass.

18. The gas separator according to claim 17, wherein the silver-glass composite contains from about 15 to 30 wt % glass.

19. The gas separator according to claim 15, wherein the electrically conductive plug material is a silver-glass composite in which the silver is selected from the group consisting of commercially pure silver and a silver alloy or mixture.

20. The gas separator according to claim 19, wherein the silver is alloyed or mixed with any one or more of gold, palladium, platinum or stainless steel.

21. The gas separator according to claim 15, wherein the electrically conductive plug material is a silver-glass composite in which the glass is stable against crystallization.

22. The gas separator according to claim 15, wherein the electrically conductive plug material is a silver-glass composite in which the glass is a high silica glass.

23. The gas separator according to claim 22, wherein the composition of the glass is 0-5.5 wt % $Na_2O$, 8-14 wt % $K_2O$, 0-2.2 wt % MgO, 1-3 wt % CaO, 0-6 wt % SrO, 0-8 wt % BaO, 6-20 wt % $B_2O_3$, 3-7 wt % $Al_2O_3$, 58-76 wt % $SiO_2$ and 0-10 wt % $ZrO_2$.

24. The A gas separator according to claim 23, wherein the composition of the glass is 0-2.0 wt % $Na_2O$, 8-13.5 wt % $K_2O$, 0-0.05 wt % MgO, 1-1.6 wt % CaO, 0.5-1 wt % SrO, 0-4.4 wt % BaO, 6-20 wt % $B_2O_3$, 3-6.0 wt % $Al_{2O3}$, 60-75 wt % $SiO_2$ and 0-5.0 wt % $ZrO_2$.

25. The gas separator according to claim 1, wherein a respective electrically conductive coating is provided on the electrically conductive plug material at the electrode-facing side of each of the first and second layers.

26. The gas separator according to claim 25, wherein each of said coatings extends over a respective electrode-contacting zone of each of the first and second layers.

27. The gas separator according to claim 25, wherein the electrically conductive coating on a cathode-facing side is of Ag or Ag alloy.

28. The gas separator according to claim 27, wherein the coating on the cathode-facing side is Ag—Sn alloy that contains from about 4 to about 20 wt % Sn.

29. The gas separator according to claim 27, wherein the coating on the cathode-facing side is Ag—Sn alloy that includes up to 10 wt % of dopants to improve the electrical conductivity of said coating.

30. The gas separator according to claim 27, wherein the coating on the cathode-facing side is Ag—Sn alloy and has a thickness in the range of 10 to 1000 μm.

31. The gas separator according to claim 27, wherein the coating on the cathode-facing side is Ag—Sn alloy having a surface layer of $SnO_2$.

32. The gas separator according to claim 27, wherein the coating on the cathode-facing side is of commercially pure silver and has a thickness in the range of 50 to 250 μm.

33. The gas separator according to claim 25, wherein the electrically conductive coating on an anode-facing side is of nickel.

34. The gas separator according to claim 33, wherein the nickel coating on the anode-facing side is commercially pure.

35. The gas separator according to claim 33, wherein the layer of nickel on the anode-facing side has a thickness in the range of 10 to 1000 μm.

36. The gas separator according to claim 33, wherein a layer of silver is disposed on the electrode-contacting zone between the coating of nickel, and the anode-facing side of the respective first or second layer.

37. The gas separator according to claim 36, wherein the layer of silver comprises commercially pure silver.

38. The gas separator according to claim 36, wherein the layer of silver has a thickness in the range of 10 to 100 μm.

39. The gas separator according to claim 1, wherein surface formations defining gas flow passages therebetween are provided on an electrode-facing side of each of the first and second layers, said surface formations being electrically conductive and overlying the perforations containing the electrically conductive plug material.

40. The gas separator according to claim 39, wherein the surface formations on an anode-facing side are formed of solid oxide fuel cell anode material and the surface formations on a cathode-facing side are formed of solid oxide fuel cell cathode material, said surface formations being bonded to the first and second layers or to any electrically conductive coating thereon.

41. The gas separator according to claim 39, wherein a respective electrically conductive coating is provided over the surface formations on the anode-facing side and on the cathode-facing side.

42. The gas separator according to claim 41, wherein the coating on the surface formations on the cathode-facing side is of metallic silver.

43. The gas separator according to claim 41, wherein the coating on the surface formations on the anode-facing side is of nickel.

44. A method of forming a fuel cell gas separator which comprises:
providing first and second layers of the gas separator, said first and second layers being formed of material that is impermeable to gases and having perforations through their thickness;
superposing the first and second layers with a third layer of electrically conductive material having a first thickness interposed between the first and second layers;
compressing the superposed first, second and third layers under conditions which cause the electrically conductive material to flow to produce a gas separator in which the third layer of electrically conductive material has a second thickness less than the first thickness and said electrically conductive material has flowed into the perforations in the first and second layers to plug said perforations.

45. The method according to claim 44, wherein the first and second layers are formed or oriented such that the perforations through said first and second layers are not coincident.

46. A fuel cell gas separator comprising a first layer which is formed of a material that is impermeable to gases, a second layer which is formed of a material that is impermeable to gases, the first and second layers having perforations through their thickness which are closed by electrically conductive plug material, and a third intermediate layer between the first and second layers which is electrically conductive and is in electrical contact with the plug material in the perforations through the first and second layers, wherein the perforations in the first layer are offset relative to the perforations in the second layer.

47. A fuel cell gas separator comprising a first layer which is formed of a material that is impermeable to gases, a second layer which is formed of a material that is impermeable to gases, the first and second layers having perforations through their thickness which are closed by electrically conductive plug material, and a third intermediate layer between the first and second layers which is electrically conductive and is in electrical contact with the plug material in the perforations through the first and second layers, wherein surface formations defining gas flow passages therebetween are provided on an electrode-facing side of each of the first and second layers, said surface formations being electrically conductive and overlying the perforations containing the electrically conductive plug material.

48. The gas separator according to claim 47, wherein the surface formations on an anode-facing side are formed of solid oxide fuel cell anode material and the surface formations on a cathode-facing side are formed of solid oxide fuel cell cathode material, said surface formations being bonded to the first and second layers or to any electrically conductive coating thereon.

49. The gas separator according to claim 47, wherein a respective electrically conductive coating is provided over the surface formations on the anode-facing side and on the cathode-facing side.

50. The gas separator according to claim 48, wherein the coating on the surface formations on the cathode-facing side is of metallic silver.

51. The gas separator according to claim 48, wherein the coating on the surface formations on the anode-facing side is of nickel.

* * * * *